United States Patent
Arad et al.

(10) Patent No.: US 12,363,551 B2
(45) Date of Patent: Jul. 15, 2025

(54) WIDEBAND OPERATION IN TVWS BANDS

(71) Applicant: Redline Communications Inc., Markham (CA)

(72) Inventors: Seyed Mohammad Ali Arad, Richmond Hill (CA); Junwen Jiang, Shanghai (CN)

(73) Assignee: Aviat U.S., Inc., Austin, TX (US)

( * ) Notice: Subject to any disclaimer, the term of this patent is extended or adjusted under 35 U.S.C. 154(b) by 484 days.

(21) Appl. No.: 17/728,072

(22) Filed: Apr. 25, 2022

(65) Prior Publication Data
US 2023/0345254 A1 Oct. 26, 2023

(51) Int. Cl.
*H04W 16/14* (2009.01)

(52) U.S. Cl.
CPC .................................. *H04W 16/14* (2013.01)

(58) Field of Classification Search
None
See application file for complete search history.

(56) References Cited

U.S. PATENT DOCUMENTS

| | | | |
|---|---|---|---|
| 2009/0273414 A1* | 11/2009 | Olcen | H03H 9/703 333/133 |
| 2012/0269246 A1* | 10/2012 | Thakur | H04W 16/14 375/224 |
| 2013/0077554 A1 | 3/2013 | Gauvreau et al. | |
| 2014/0044000 A1 | 2/2014 | Charbit et al. | |
| 2016/0345322 A1 | 11/2016 | Chincholi et al. | |
| 2017/0302243 A1* | 10/2017 | Horita | H03H 7/1758 |
| 2018/0331703 A1* | 11/2018 | Horita | H04B 1/48 |

OTHER PUBLICATIONS

International Search Report dated Jul. 21, 2023 for corresponding PCT Application No. PCT/US2023/019766.
Written Opinion dated Jul. 21, 2023 for corresponding PCT Application No. PCT/US2023/019766.

* cited by examiner

*Primary Examiner* — Jay L Vogel
(74) *Attorney, Agent, or Firm* — Stratford Group Ltd.

(57) ABSTRACT

Disclosed are white space communications systems for wideband communications over TVWS bands. The white space communications systems include tunable frequency filters for providing non-contiguous coverage according to WSDB requirements blocking segments associated with occupied TV channels.

19 Claims, 12 Drawing Sheets

WIDEBAND OPERATION IN TVWS BANDS

FIELD OF THE INVENTION

The present disclosure relates to wideband communications systems, in particular, transceiver systems operating as white space devices within the Television White Space (TVWS) spectrum.

BRIEF SUMMARY

According to a first aspect, there is provided a white space communications system for wideband communications over a Television White Space (TVWS) spectrum within a target TVWS band, the system including: at least one tunable frequency filter along at least a transmit path for rejecting frequencies within at least one blocked segment of frequencies within a range of frequencies spanned by the target TVWS band; and at least one sharp bandpass filter along at least a transmit path for providing sharp rejection of out-of-band emissions (OOBE) outside the range of frequencies spanned by the target TVWS band.

In some embodiments, the at least one tunable frequency filter comprises at least one tunable bandpass filter.

Some embodiments further provide for a plurality of RF chains each for communicating over a frequency subportion of the target TVWS band, the frequency subportions of the plurality of RF chains collectively spanning the target TVWS band, in which the at least one tunable bandpass filter comprises one or more tunable bandpass filters located along each RF chain.

In some embodiments, the RF chains are multiplexed by multiplexers and demultiplexed by demultiplexers separate from the multiplexers.

In some embodiments, the at least one sharp bandpass filter includes a plurality of bandpass filters collectively spanning the target TVWS band, each bandpass filter located in a respective RF chain in a transmit path.

In some embodiments, the at least one tunable frequency filter includes at least one tunable band-stop filter, and in which the at least one sharp bandpass filter includes a plurality of bandpass filters collectively spanning the target TVWS band, each bandpass filter located in a respective RF chain in a transmit path.

In some embodiments, the at least one tunable frequency filter includes at least one tunable band-stop filter, and in which the at least one sharp bandpass filter includes a sharp wideband bandpass filter.

In some embodiments, the at least one tunable frequency filter comprises at least one tunable band-stop filter.

In some embodiments, the at least one sharp bandpass filter includes a plurality of bandpass filters collectively spanning the target TVWS band.

In some embodiments, the at least one sharp bandpass filter includes a sharp wideband bandpass filter.

In some embodiments, each at least one tunable band-stop filter has a tunable center frequency and has a fixed bandwidth substantially the same as that of a TV channel.

In some embodiments, each at least one tunable band-stop filter has a tunable center frequency and a tunable bandwidth.

Some embodiments further provide for a plurality of RF chains each for communicating over a frequency subportion of the target TVWS band, the frequency subportions of the plurality of RF chains collectively spanning the target TVWS band, in which the RF chains are multiplexed by multiplexers and demultiplexed by demultiplexers separate from the multiplexers.

Some embodiments further provide for a plurality of RF chains each for communicating over a frequency subportion of the target TVWS band, the frequency subportions of the plurality of RF chains collectively spanning the target TVWS band.

In some embodiments, the at least one sharp bandpass filter comprises a plurality of bandpass filters collectively spanning the target TVWS band, each bandpass filter located along a respective RF chain.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the scope of an invention as defined by the appended claims.

DETAILED DESCRIPTION

Ultra-long-range wireless communications face the challenge of providing optimal wideband communications performance while avoiding interfering with occupied television (TV) broadcast channels. The present disclosure describes solutions for wideband utilization of TV white space (TVWS) while meeting regulations, limits, and requirements surrounding a TV white space (TVWS) spectrum. In Canada and the U.S., the TVWS spectrum covers several frequency ranges including the 470-602 MHz range, referred to hereinbelow as a target TVWS band. Although the following describes an exemplary solution in the context of the TVWS spectrum in general, and the target TVWS band in particular, the teachings of the present disclosure are to be understood as generally applicable to any subset of a TVWS spectrum in any jurisdiction subject to similar wideband communication requirements.

White space communications apparatus or systems (also commonly referred to simply as white space devices or WSDs) are allowed to operate in TVWS bands in accordance with requirements of the TVWS database (WSDB). The WSDB provides to WSDs lists of available channels and corresponding maximum permitted power levels for each available channel, based upon the geolocation of the WSD, for protecting communications of licensed services and systems including broadcast TV stations in the area.

WSDs can use TV channels in TVWS bands that are indicated as available by the WSDB. Depending on the WSD location and transmit power, the requirements of the WSDB may block or restrict the WSD's access to occupied TV channels and adjacent TV channels, to protect nearby TV broadcast stations. As a result, the available TVWS spectrum may include several non-contiguous frequency blocks. The present disclosure presents solutions for wideband operation in TVWS bands using the available spectrum that could include contiguous or non-contiguous frequency blocks.

Regulatory bodies such as the Federal Communications Commission (FCC) and Innovation, Science and Economic Development Canada (ISED) specify out-of-band emission (OOBE) requirements for TVWS operation which define emission limits outside of any utilized contiguous frequency block. For wideband operation using multiple non-contiguous frequency blocks, the WSD must meet the OOBE requirements in the frequency gaps between non-contiguous blocks. The following discloses several RF filtering solutions for this problem involving multiple band-stop filters (BSFs) and/or bandpass filters (BPFs). Since the presence and location of blocked channels is controlled by WSDB and is not known or fixed when designing the solution, tunable filters are utilized to provide OOBE rejection when and where it is needed.

Figure 1:
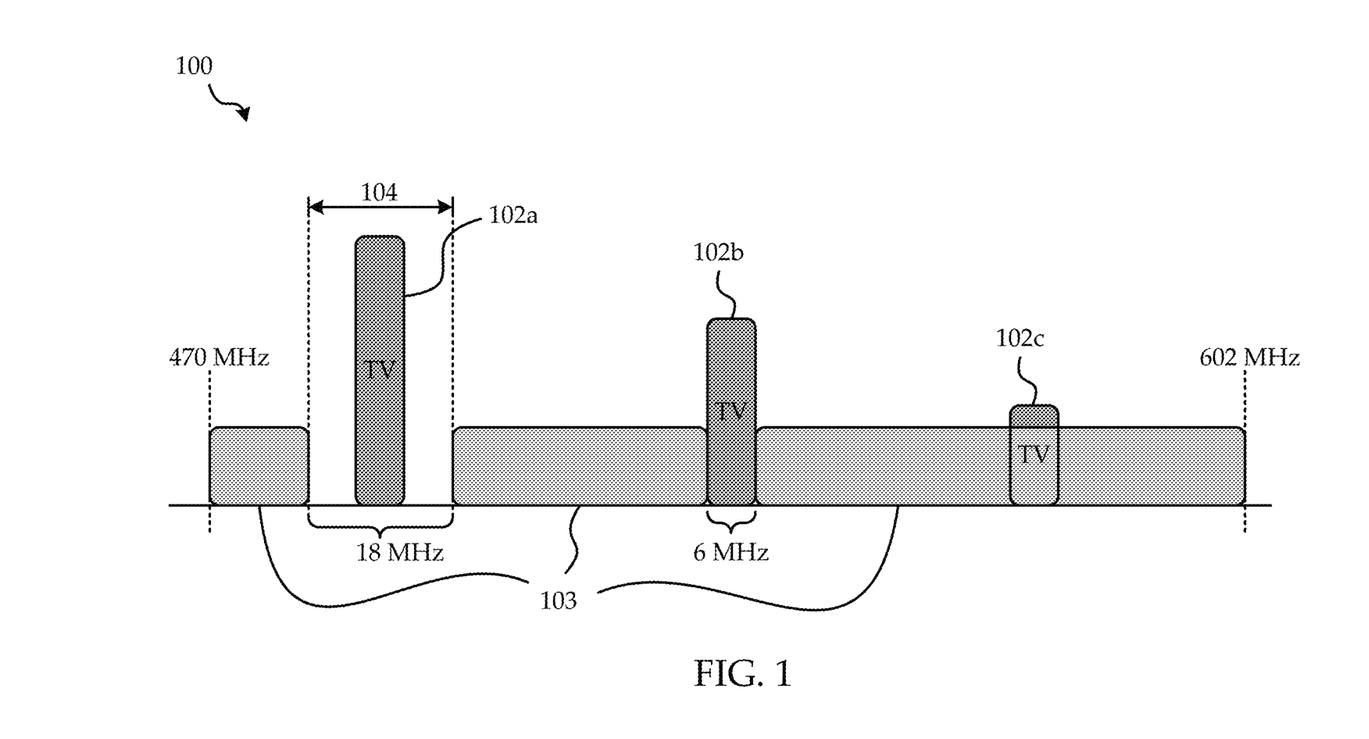
FIG. 1 illustrates an example of available bandwidth in accordance with regulatory requirements for a white space communications system located in proximity to TV broadcast stations.

With reference to FIG. 1, an example 100 of available bandwidth within a target TVWS band spanning 470 MHz-602 MHz in accordance with regulatory requirements for a white space communications system located in proximity to TV broadcast stations will now be described.

The available white space spectrum 103 for use by WSDs is limited by current U.S. and Canadian regulatory requirements, which specify the size of blocked frequency segments for the protection of each TV channel 102 depending on the location and power of the WSD device. When a WSD is located close enough to a TV station and/or operating at a high enough power, an occupied TV channel 102a is protected by a blocked frequency segment 104 three TV channels (e.g., 18 MHz) wide, whereas when the WSD is located farther away or operating at lower power, an occupied TV channel 102b is protected by a blocked frequency segment one TV channel wide (e.g., 6 MHz). When a WSD is located far enough from a TV station and/or operating at a low enough power, the WSD may utilize the TV channel 102c for communications.

Figure 2A:
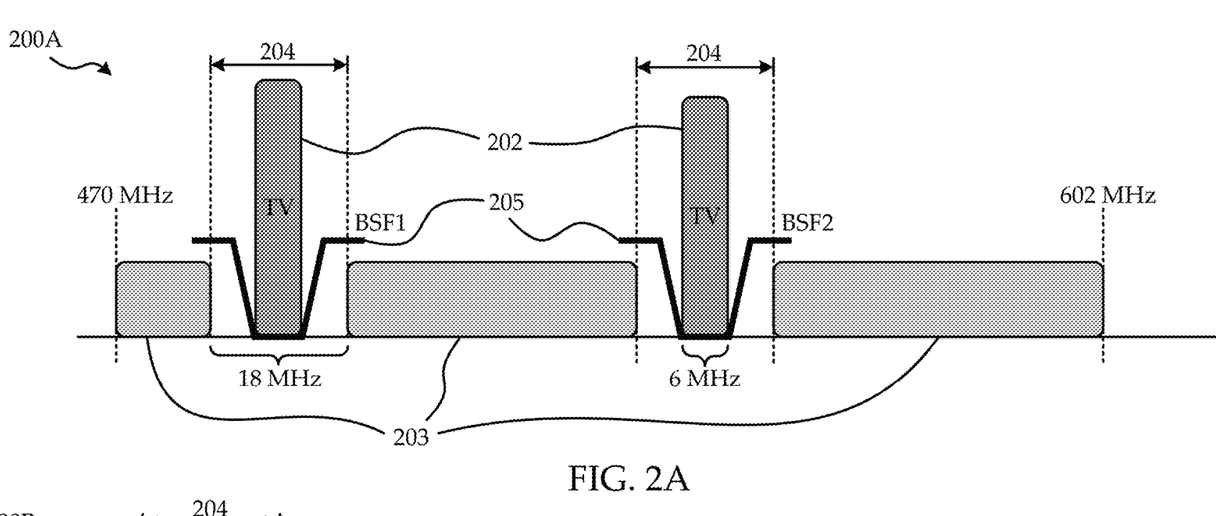
FIG. 2A illustrates bandwidth configuration of a white space communications system according to an embodiment utilizing band-stop filtering.
Figure 2B:
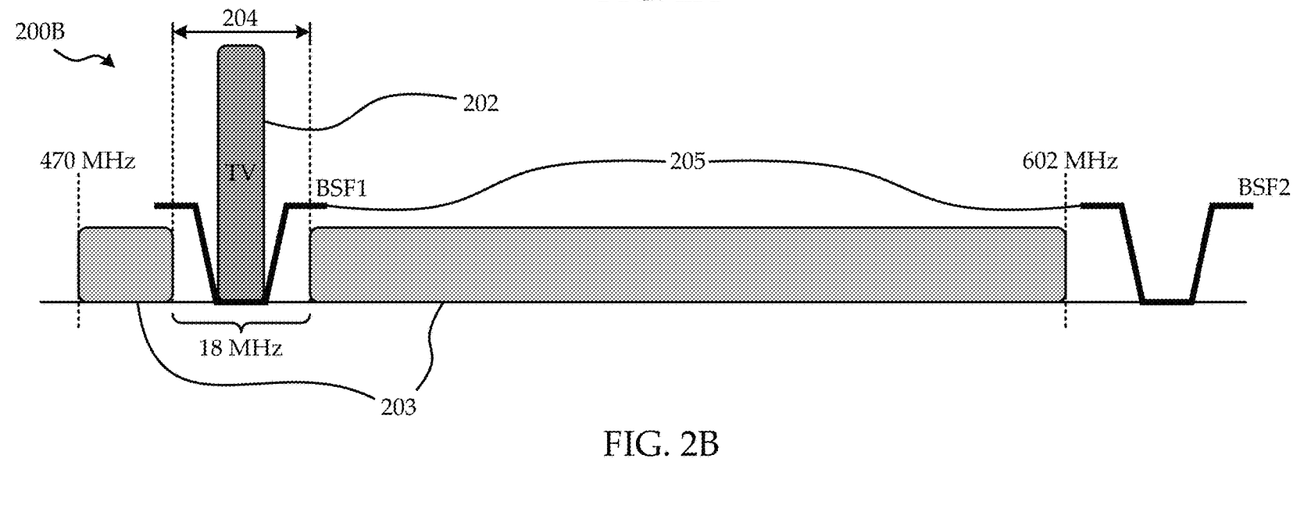
FIG. 2B illustrates bandwidth configuration of a white space communications system according to an embodiment utilizing band-stop filtering.

With reference to FIGS. 2A and 2B, bandwidth configurations 200A and 200B of a white space communications system according to an embodiment utilizing band-stop filtering will now be described.

An embodiment employing band-stop filters may use a cascade of multiple band-stop filters with tunable center frequency and fixed bandwidth. The bandwidth of the band-stop filters is chosen according to regulatory requirements, for example, current U.S. and Canadian requirements. As illustrated in FIG. 2A, frequencies at and around two occupied TV channels 202 can be avoided with band-stop filtering. Here, which is a case of blocked segments three channels wide 204, each band-stop filter BSF1 BSF2 has a fixed single TV channel band-stop bandwidth (e.g. 6 MHz) and is tuned to the center channel of each blocked segment 204, the channel occupied by the TV channels 202. The filtering profiles 205 provided in FIGS. 2A and 2B symbolize the filter response of band-stop filters BSF1 BSF2 and are included for illustration only.

The two outer channels in each three-channel segment 204 have more relaxed OOBE requirements than the middle channel. The white space communications system relies on techniques such a power amplifier (PA) linearization to meet the OOBE requirement in these outer channels. The band-stop filter BSF1 or BSF2 is used to meet OOBE requirement of the middle channel. The center frequency of the band-stop filter is tuned based on the location of the blocked segment 204. In the absence of a three-channel blocked segment 204 or in cases where the number of band-stop filters exceeds the number of three-channel blocked segments 204, the center frequency of a band-stop filter is tuned out of the target band 203 as filter rejection is not required, as illustrated for example in FIG. 2B for BSF2. Having a fixed bandwidth for the band-stop filter simplifies its design and implementation of the white space communication system. In some embodiments, the band-stop filter bandwidth can also be tunable to handle cases with multiple adjacent/overlapping blocked segments 204. In such an embodiment, the widths of the band-stop filters can be widened to block all middle channels in the overall blocked segment (i.e., channels excluding the two outer channels).

In some embodiments, when a blocked segment is only a single TV channel wide, as would be the case for TV channel 102b of FIG. 1, filtering is not used but instead other techniques such as PA linearization (e.g. Digital pre-Distortion or DPD) or Tx power reduction are utilized to meet the required OOBE reduction.

Figure 3:
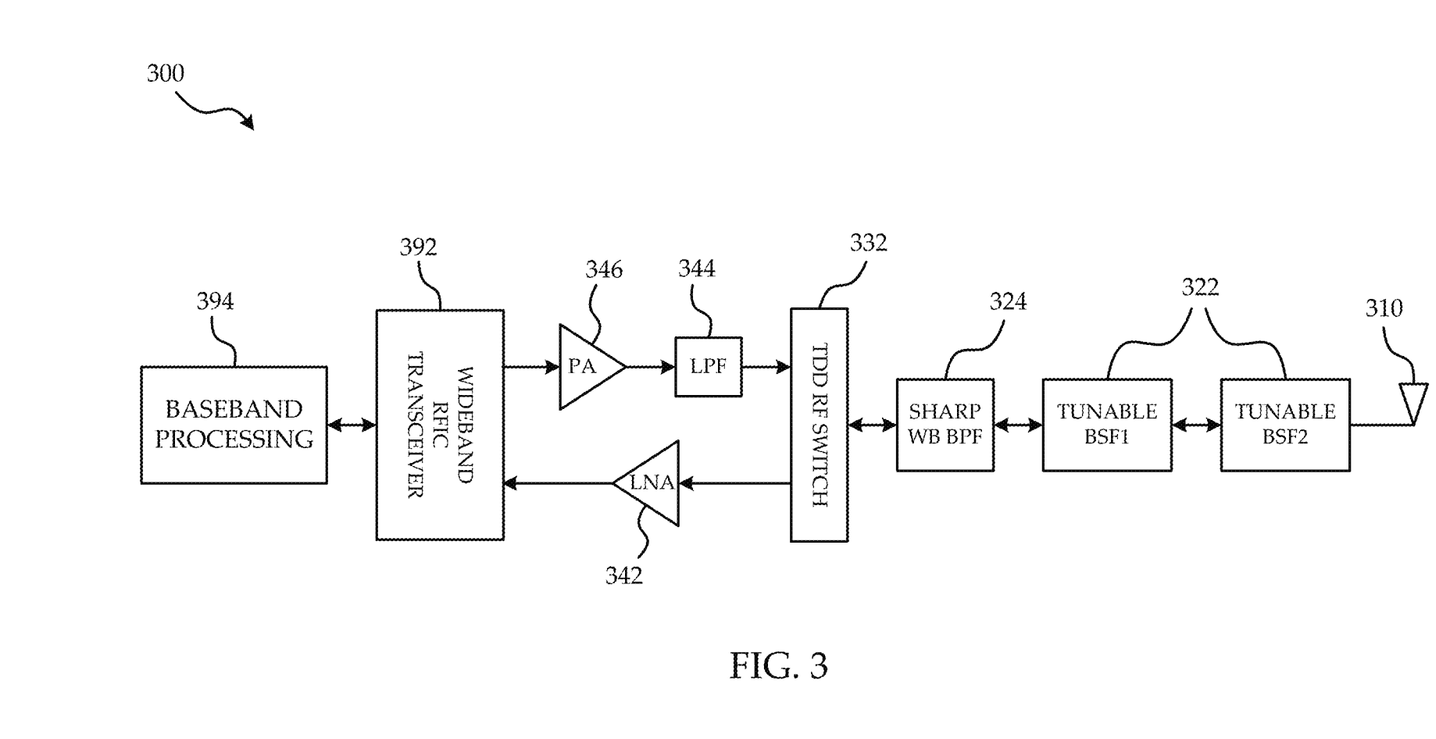
FIG. 3 is a schematic block diagram of a white space communications system according to an embodiment which utilizes wideband at baseband and tunable band-stop filters.

Referring now also to FIG. 3 a white space communications system 300 according to an embodiment which utilizes a wideband signal at baseband and tunable band-stop filters, will now be described.

According to some embodiments, a band-stop filtering solution can be utilized in systems with a wideband RF signal that can occupy all of the available bandwidth or a substantial portion of it in the target TVWS band. As an example, the system 300 may use a wideband Orthogonal Frequency Division Multiplexing (OFDM) signal with empty subcarriers inside blocked channels. The system 300 includes baseband processing 394 e.g. of a wideband OFDM signal, coupled to a wideband radio frequency integrated circuit (RFIC) transceiver 392. Along a transmit path, the wideband RFIC transceiver 392 is coupled via a PA 346 for amplifying the transmitted signal and a low pass filter 344 for rejecting high frequency components, to a time division duplex (TDD) RF switch 332. Along a receive path, the wideband RFIC transceiver 392 is coupled via a low noise amplifier (LNA) 342 for compensating for insertion loss, to the time division duplex (TDD) RF switch 332. Coupled along a single transmit-receive path between the TDD RF switch 332 and an antenna 310 are a sharp wideband (WB) bandpass filter (BPF) 324 and multiple tunable band-stop filters 322 (e.g. BSF1 BSF2). The WB BPF 324 provides sharp rejection of all frequencies outside of the entire range of targeted usable white space, for example, below 470 MHz and above 602 MHz, while the band-stop filters BSF1 BSF2 322 provide the band-stop filtering in the blocked channels described above in association with FIGS. 2A and 2B.

Figure 4:
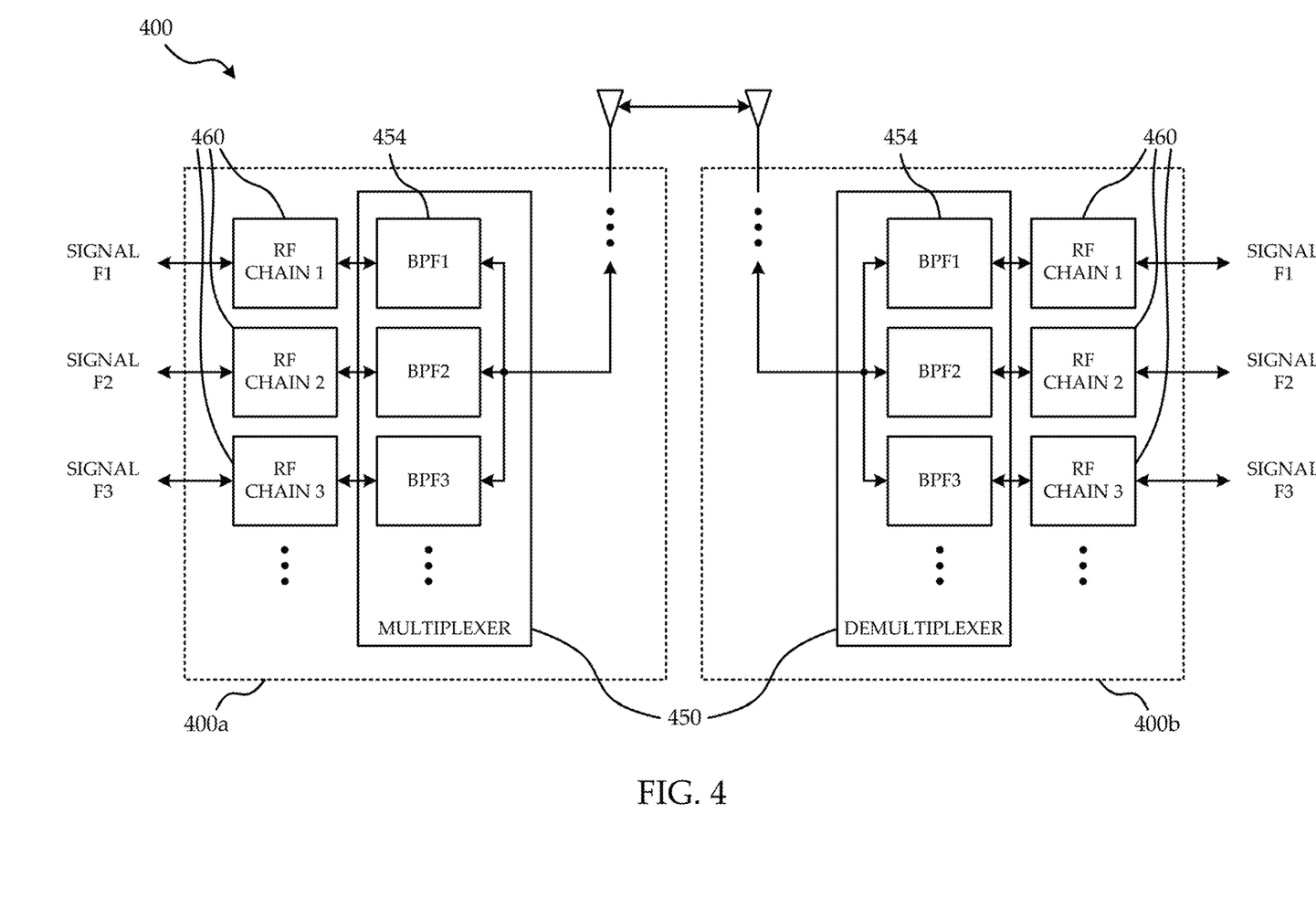
FIG. 4 is a schematic block diagram of a white space communications system according to an embodiment which utilizes multiple RF chains and multiplexing to cover a wider target TVWS band.

Referring now also to FIG. 4, a white space communications system 400 according to an embodiment which utilizes multiple RF chains and multiplexing/demultiplexing to cover the wide target TVWS band will now be described. In the example system of FIG. 4, two WSDs 400a 400b communicating via over-the-air transmissions are shown. As an alternative to a system with wideband capability at the baseband, in some embodiments such as the system 400 of FIG. 4, wideband use of the target TVWS band is achieved by employing multiple RF chains 460, each covering a portion of the target TVWS band and collectively spanning the entire target TVWS band. This is implemented by aggregating/splitting the RF signals using multiplexing/demultiplexing such as with multiplexers/demultiplexers 450. In some embodiments the multiplexers/demultiplexers 450 are triplexers. In some embodiments the multiplexers/demultiplexers 450 include bandpass filters 454 corresponding to the respective frequency bands of each RF chain 460.

Figure 5:
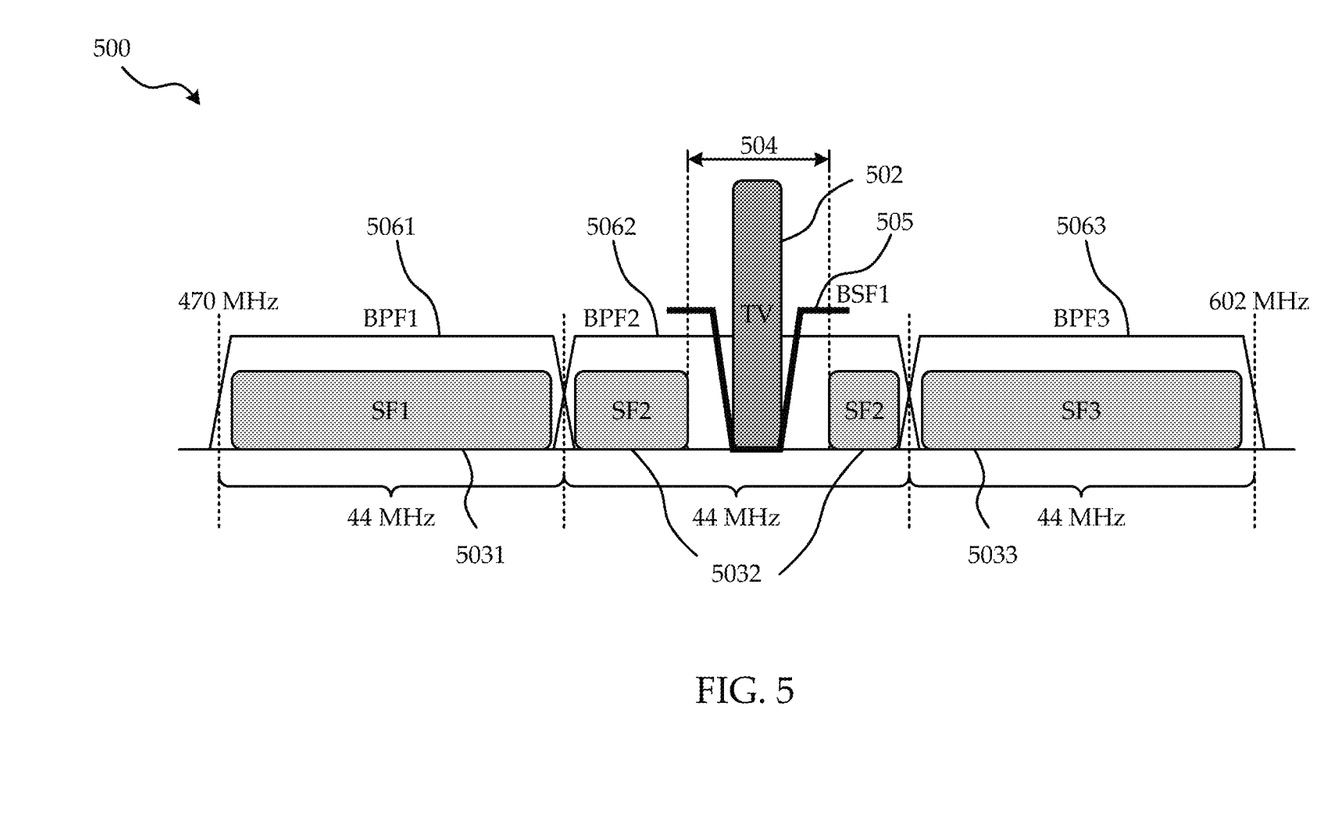
FIG. 5 illustrates the bandwidth configuration of a white space communications system according to an embodiment utilizing band-stop filtering and bandpass filtering.
Figure 6:
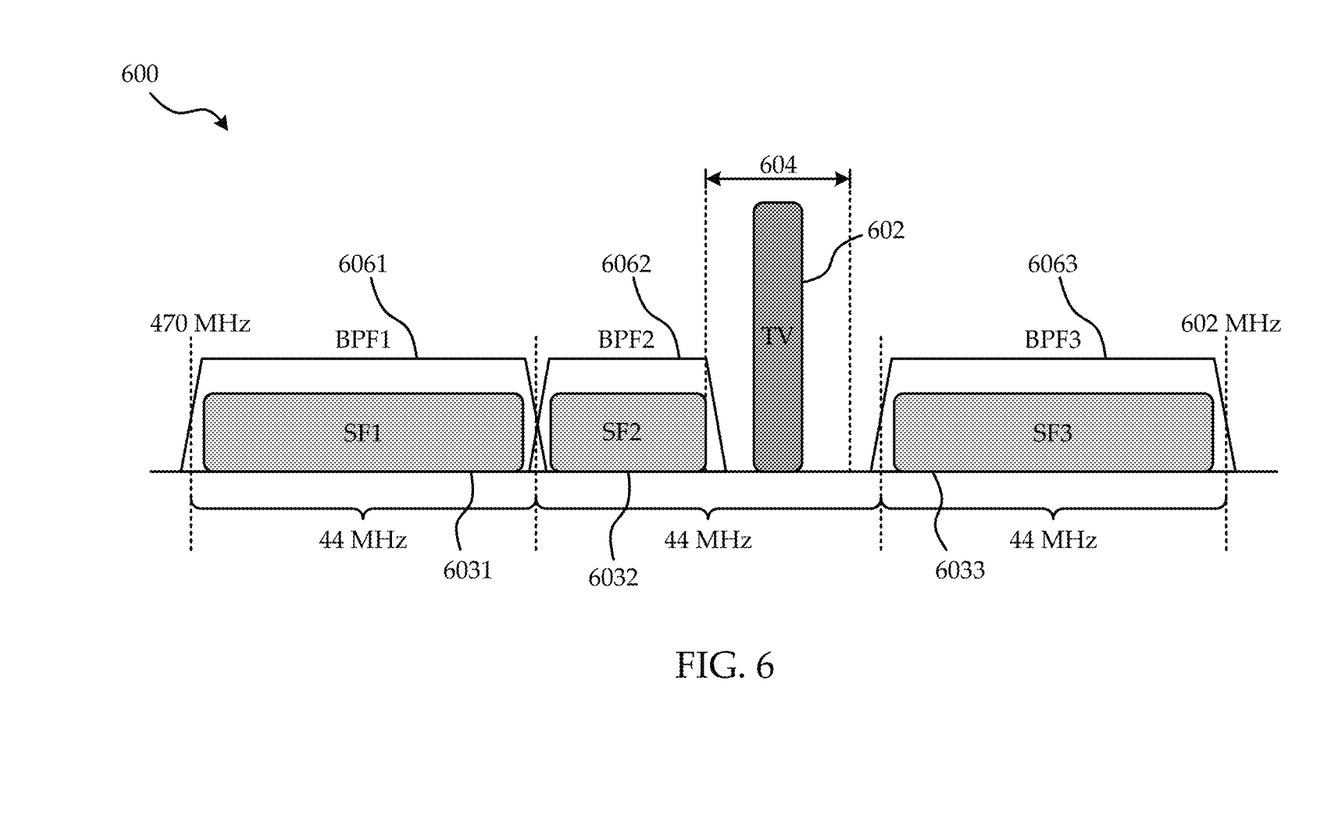
FIG. 6 illustrates bandwidth configuration of a white space communications system according to an embodiment utilizing bandpass filtering.

Referring now also to FIGS. 5 and 6, bandwidth configuration of 500 600 white space communications systems according to embodiments utilizing band-stop filtering and bandpass filtering or bandpass filtering alone for the system with multiple RF chains as shown in FIG. 4, will now be described.

In some embodiments, bandpass filters with fixed center and fixed bandwidth, as well as tunable band-stop filters are utilized to meet OOBE requirements, as illustrated in FIG. 5. As shown in FIG. 4 a bandpass filter 454 is provided for each RF chain 460 and may be situated within the multiplexers/demultiplexers 450. Each signal frequency band SF1 5031, SF2 5032, SF3 5033 occupies the available white space spectrum within the frequency portion of each RF chain, the entire target TVWS band (e.g., 132 MHz bandwidth) being divided into three portions, e.g. each 44 MHz wide. In the example of FIG. 5, the second signal frequency band SF2 has a blocked segment 504 within it, centered on a TV channel 502 by virtue of a TV station being in proximity. This TV channel is protected using a band-stop filter BSF1 with a filtering response 505 including a single TV channel wide stopband. As described above, the white space communications system relies on other techniques to meet the OOBE requirement for the outer channels on either side of TV channel 502. Either in addition to or as a replacement for a sharp wideband filter, each RF chain includes a bandpass filter BPF1, BPF2, BPF3, bandpass filtering the respective frequency ranges 5061 5062 5063 for each RF chain.

In some embodiments, only bandpass filtering is utilized to meet OOBE requirements and to avoid blocked segments as shown in FIG. 6. As with the example illustrated in FIG. 5, a bandpass filter 454 is provided for each RF chain 460 and may be situated within the multiplexers/demultiplexers 450, and each signal frequency band SF1 6031, SF2 6032, SF3 6033 occupies all or most of the available white space spectrum within the frequency portion of each RF chain, the entire target TVWS band (e.g., 132 MHz bandwidth) being divided into three portions, e.g. each 44 MHz wide. As with the example shown in FIG. 5, each RF chain includes a bandpass filter BPF1, BPF2, BPF3, bandpass filtering the respective frequency ranges 6061 6062 6063 within each RF chain, however the bandpass filters BPF1, BPF2, BPF3 here are tunable. In the example of FIG. 6, the second RF chain has a blocked segment within its frequency portion, centered on a TV channel 602 by virtue of a TV station being in proximity. This TV channel, however, is not protected using a band-stop filter, but instead is protected by a tuning of the center frequency and the bandwidth of the corresponding bandpass filter BPF2 so that the blocked segment associated with the TV channel 602 is blocked. Bandpass filter BPF2 is tuned to cover the bigger portion of the available white space spectrum in the frequency portion of its corresponding RF chain, which in the example of FIG. 6 corresponds to the block of frequencies below the TV channel 602. As described above, the white space communications system relies on other techniques, such as PA linearization, when necessary to meet the OOBE requirements for the outer channels on either side of TV channel 602. For example, in FIG. 6, in order to maximize the bandwidth of SF2 6032, the BPF2 filtering frequency range 6062 is tuned such that its response rolls off in the lower frequency channel next to the TV channel 602, and PA linearization is used to meet the OOBE requirements in that channel.

The embodiment of FIG. 6 has the advantage of lower complexity and less insertion loss, while the embodiment of FIG. 5 has the advantage of greater potential bandwidth, particularly when a blocked segment protecting a TV channel falls near to the center of an RF chain's allocated frequency range.

Figure 7:
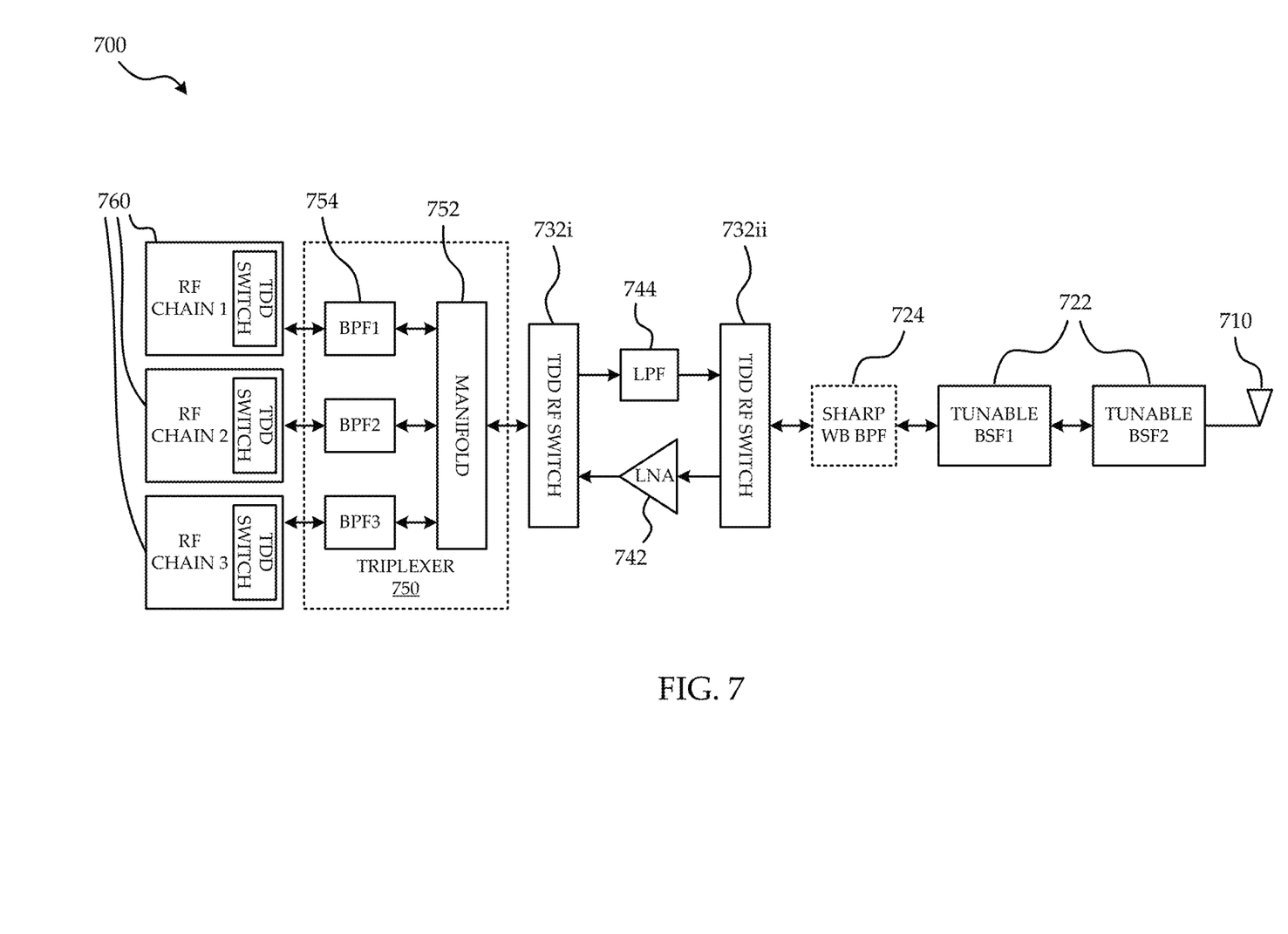
FIG. 7 is a schematic block diagram of a white space communications system according to an embodiment which utilizes a single multiplexer/demultiplexer.

Referring now also to FIG. 7, a white space communications system 700 according to an embodiment which utilizes a single multiplexer/demultiplexer will now be described.

The communications system 700 of FIG. 7 implements a tunable band-stop filter approach using a single multiplexer/demultiplexer for both Tx and Rx signals. Each RF chain 760 includes a TDD switch for correctly switching between Tx and Rx paths (not shown) farther along the RF chain 760 and is coupled to a respective port of a triplexer 750. The triplexer 750 includes fixed bandpass filters 754, one respectively for each RF chain 760 and covering the RF chain's portion of the target TVWS band. The bandpass filters 754 are coupled to ports of the triplexer's manifold 752 for multiplexing/demultiplexing. The manifold 752 of the triplexer 750 is coupled to a TDD RF switch 732i which is coupled to another TDD RF switch 732ii via an LPF 744 along a transmit path and an LNA 742 along a receive path. The other TDD RF switch 732ii is coupled via a transmit-receive path including tunable band-stop filters 722 and optionally a sharp WB BPF 724 to an antenna 710. The WB BPF 724 with sharp edges covers the whole target frequency range (e.g. 470 MHz-602 MHz) to meet OOBE requirements out of the target band. This filter is not needed if the fixed BPFs 754 in the triplexer 750 can provide the required sharp rejection out of the target band. As described above, the BSFs 722 may be used to provide band-stop filtering of blocked segments.

Figure 8:
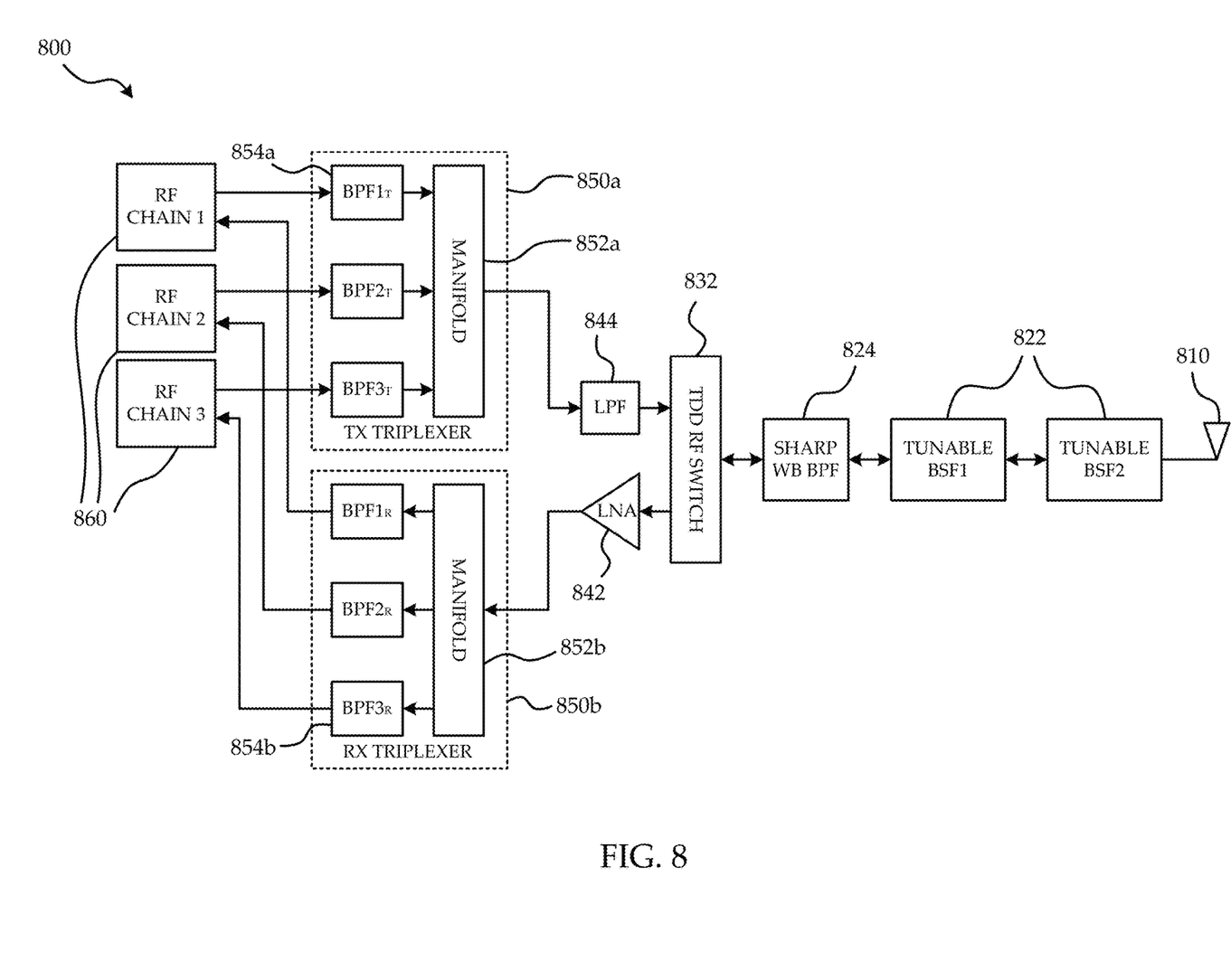
FIG. 8 is a schematic block diagram of a white space communications system according to an embodiment which utilizes separate Tx and Rx triplexers and a sharp wideband bandpass filter.

Referring now also to FIG. 8, a white space communications system 800 according to an embodiment which utilizes separate Tx and Rx triplexers and a sharp wideband bandpass filter will now be described.

The communications system 800 of FIG. 8 is an alternative embodiment to that of FIG. 7, utilizing separate triplexers 850 for transmit and receive paths, which can reduce the system insertion loss. Each RF chain 860 is coupled via a transmit path to the TX triplexer 850a and along a receive path to the Rx triplexer 850b. Each triplexer 850 includes fixed bandpass filters 854, one respectively for each RF chain 860 and covering the RF chain's portion of the target TVWS band. The bandpass filters 854 are coupled to ports of the triplexers' manifolds 852 for multiplexing or demultiplexing. The manifold 852a of the Tx triplexer 850a is coupled to a TDD RF switch 832 via an LPF 844 along a transmit path. The manifold 852b of the Rx triplexer 850b is coupled to the TDD RF switch 832 via an LNA 842 along a receive path. The TDD RF switch 832 is coupled via a transmit-receive path including tunable band-stop filters 822 and a sharp WB BPF 824 to an antenna 810. The WB BPF 824 with sharp edges covers the whole target frequency range (e.g. 470 MHz-602 MHz) to meet OOBE requirements out of the target band. As described above, the BSFs 822 may be used to provide band-stop filtering of blocked segments.

Figure 9:
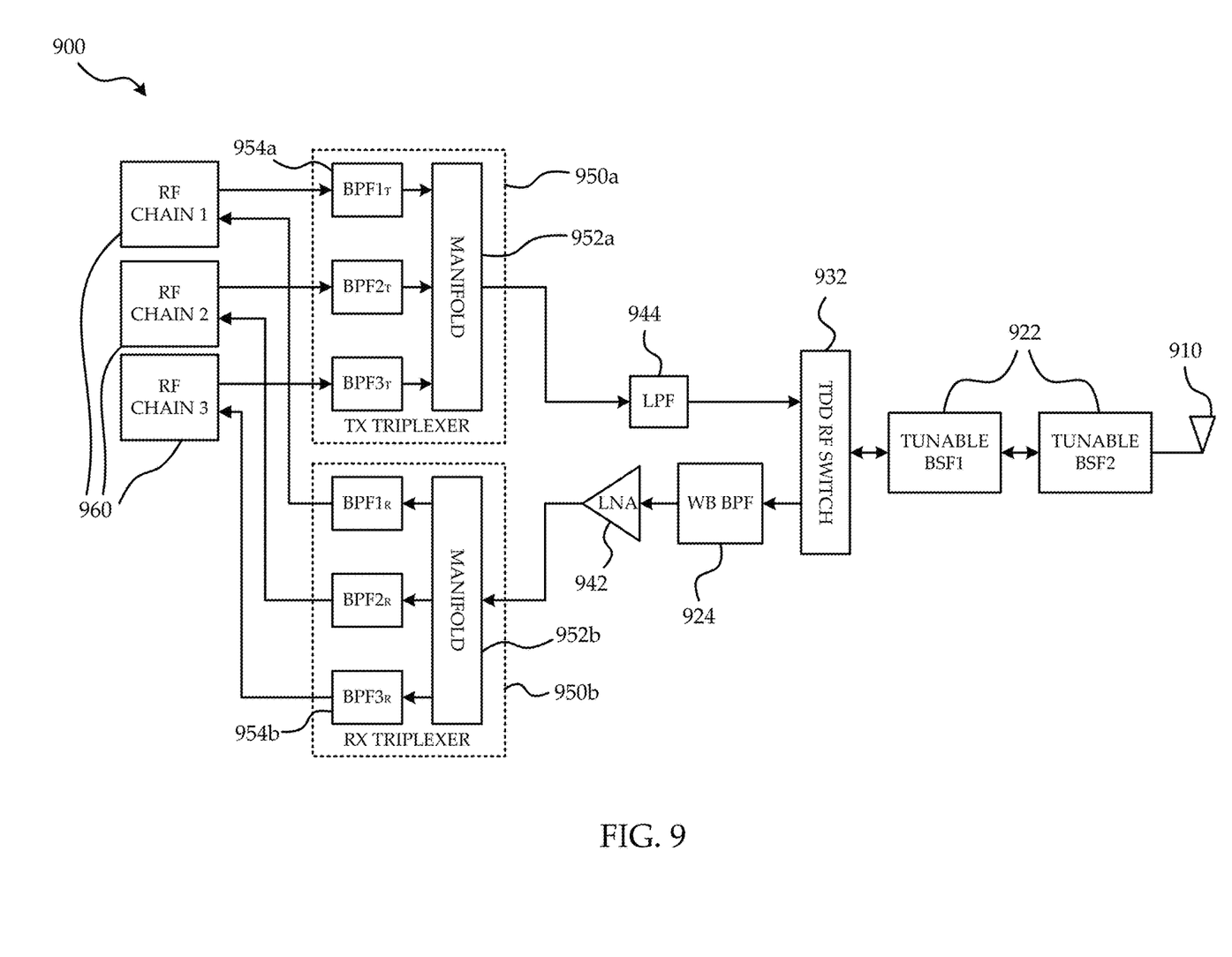
FIG. 9 is a schematic block diagram of a white space communications system according to an embodiment which utilizes separate Tx and Rx triplexers and sharp bandpass filters in the Tx triplexer.

Referring now also to FIG. 9, a white space communications system 900 according to an embodiment which utilizes separate Tx and Rx triplexers and sharp bandpass filters in the Tx triplexer will now be described.

The communications system 900 of FIG. 9 is an alternative embodiment to that of FIG. 8, including sharp bandpass filters in the Tx triplexer to provide sharp passband filtering rather than using a sharp WB BPF somewhere else in the transmit path. Each RF chain 960 is coupled via a transmit path to the Tx triplexer 950a and along a receive path to the Rx triplexer 950b. Each triplexer 950 includes fixed bandpass filters 954, one respectively for each RF chain 960 and covering the RF chain's portion of the target TVWS band. Together, the bandpass filters 954a of the Tx triplexer 950a sufficiently reject out-of-band transmissions so as to eliminate the need for a sharp WB BPF elsewhere. This is achieved, in some embodiments, by including sharp bandpass filters 954a on all of the transmit paths in the Tx triplexer 960a, or providing sharp bandpass filters 954a only along the highest and lowest frequency transmit paths in the Tx triplexer 960a. In some embodiments, only the upper frequency edge of a sharp bandpass filter 954a along the highest frequency transmit path and the lower frequency edge of a sharp bandpass filter 954a along the lowest frequency transmit path, are sharp. The bandpass filters 954 are coupled to ports of the triplexers' manifolds 952 for multiplexing or demultiplexing. The manifold 952a of the Tx triplexer 950a is coupled to a TDD RF switch 932 via an LPF 944 along a transmit path, and the manifold 952b of the Rx triplexer 950b is coupled to the TDD RF switch 932 via an LNA 942 and a WB BPF 924 along a receive path. The WB BPF 924 provides protection for the LNA 942. The TDD RF switch 932 is coupled via a transmit-receive path including tunable band-stop filters 922 to an antenna 910. As described above, the BSFs 922 may be used to provide band-stop filtering of blocked segments.

Figure 10:
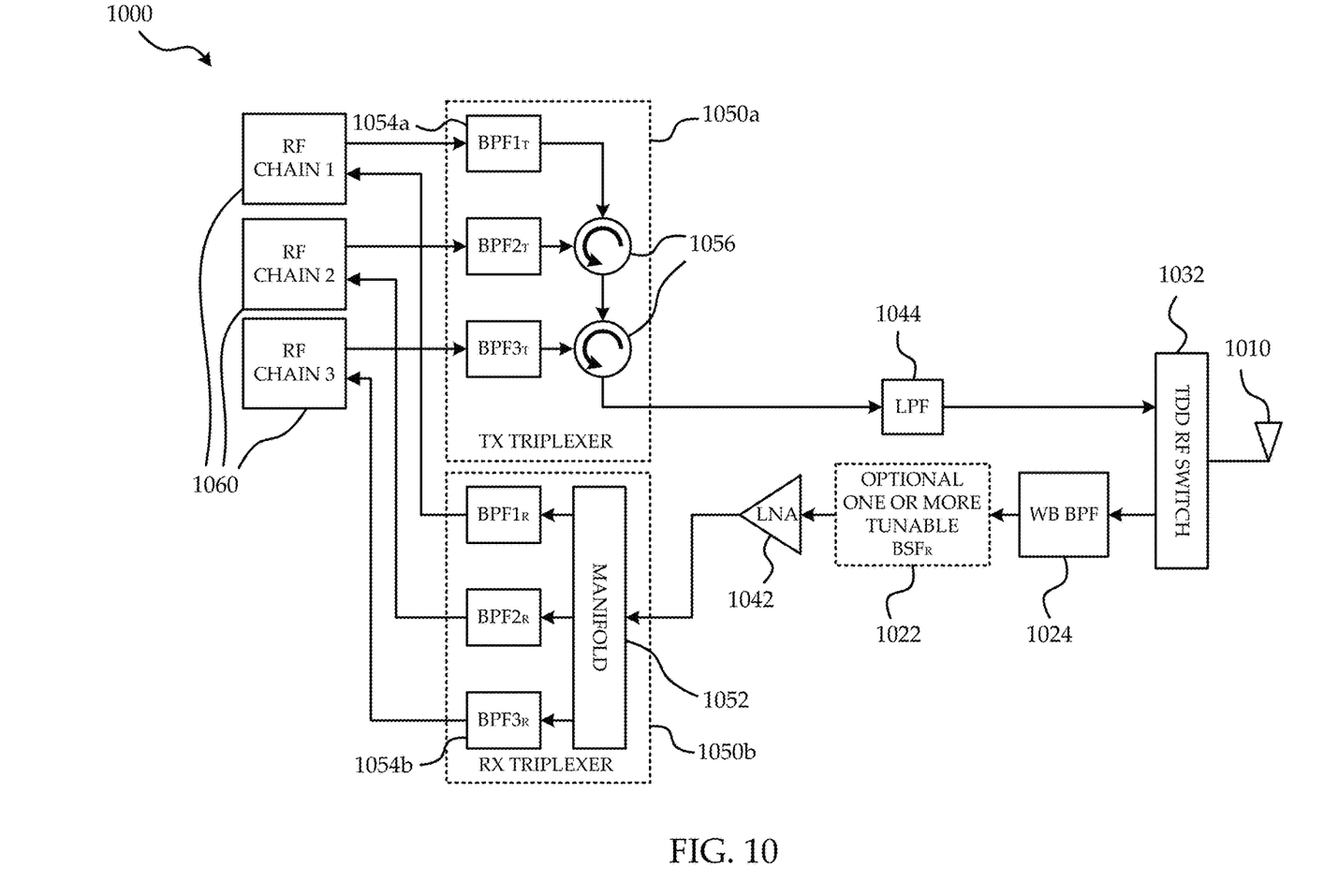
FIG. 10 is a schematic block diagram of a white space communications system according to an embodiment which utilizes separate Tx and Rx triplexers, tunable bandpass filters in the Tx triplexer, and tunable band-stop filters in the Rx path.

Referring also to FIG. 10, a white space communications system 1000 according to an embodiment which utilizes separate Tx and Rx triplexers, tunable bandpass filters in the Tx triplexer, and tunable band-stop filters in the Rx path will now be described.

Each RF chain 1060 is coupled via a transmit path to the Tx triplexer 1050a and along a receive path to the Rx triplexer 1050b. The Tx triplexer 1050a includes tunable bandpass filters 1054a with tunable centers and bandwidths, one respectively for each RF chain 1060 and covering the RF chain's portion of the target TVWS band. The Rx triplexer 1050b includes fixed bandpass filters 1054b, with fixed centers and bandwidths one respectively for each RF chain 1060 and covering the RF chain's portion of the target TVWS band. The bandpass filters 1054a of the Tx triplexer 1050a are coupled to two cascaded circulators 1056 for multiplexing. The bandpass filters 1054b of the Rx triplexer 1050b are coupled to ports of the Rx triplexer's manifold 1052 for demultiplexing. The cascaded circulators 1056 of the Tx triplexer 1050a is coupled to a TDD RF switch 1032 via an LPF 1044 along a transmit path. The manifold 1052 of the Rx triplexer 1050b is coupled to the TDD RF switch 1032 via an LNA 1042, a WB BPF 1024, and optionally one or more tunable band-stop filters BSFR 1022 along a receive path. The WB BPF 1024 and optional band-stop filters BSFR 1022 provide protection for the LNA 1042. The TDD RF switch 1032 is coupled via a transmit-receive path to an antenna 1010.

Figure 11:
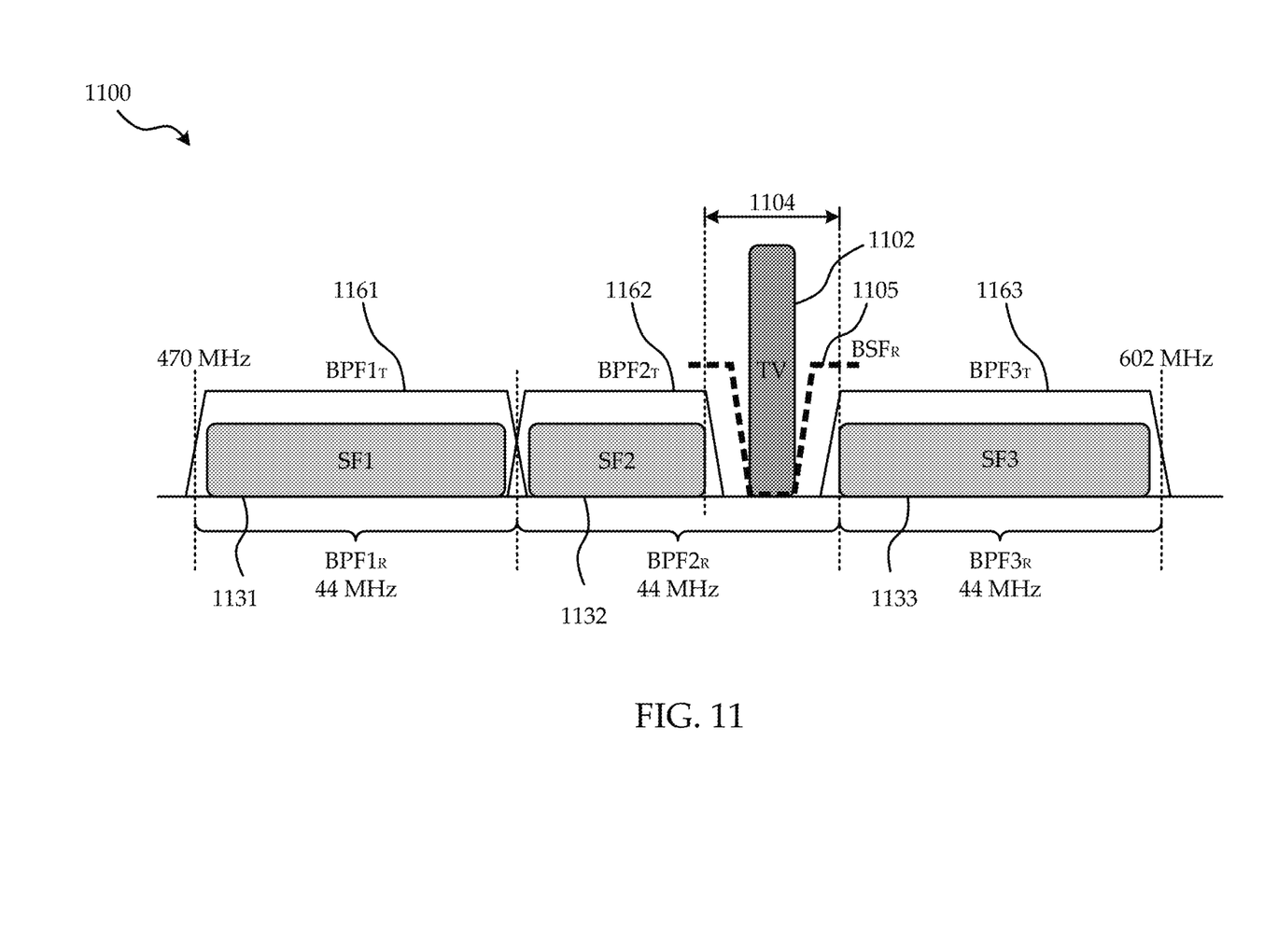
FIG. 11 illustrates bandwidth configuration of a white space communications system according to the embodiment illustrated in FIG. 10.

Referring also to FIG. 11, the bandwidth configuration 1100 of a white space communications system 1000 according to the embodiment illustrated in FIG. 10, will now be described.

In some embodiments, bandpass filters with fixed center and bandwidth are utilized along receive paths, along with tunable bandpass filters with tunable centers and bandwidths utilized along transmit paths, as illustrated in FIG. 11. As shown in FIG. 10, fixed bandpass filters 1054b are provided in the Rx triplexer 1050b for each RF chain 1060. Each signal frequency band SF1 1131, SF2 1132, SF3 1133 occupies all or most of the available white space spectrum within the frequency portion of each RF chain, the entire target TVWS band (e.g., 132 MHz bandwidth) being divided into three portions, e.g. each 44 MHz wide. The Rx triplexer 1050b includes fixed bandpass filters $BPF1_R$, $BPF2_R$, $BPF3_R$, for bandpass filtering the respective frequency ranges for each RF chain (e.g., 44 MHz wide). The Tx triplexer 1050a includes tunable bandpass filters $BPF1_T$, $BPF2_T$, $BPF3_T$, for bandpass filtering the respective frequency ranges 1161 1162 1163 within each RF chain. In the example of FIG. 11, the second RF chain has a blocked segment 1104 within its respective frequency range, centered on a TV channel 1102 by virtue of a TV station being in proximity. This TV channel is protected by a tuning of the center frequency and the bandwidth of the corresponding bandpass filter $BPF2_T$ so that the blocked segment 1104 associated with the TV channel 1102 is blocked. As described above, the white space communications system relies on other techniques, such as PA linearization, when necessary to meet the OOBE requirements for the outer channels on either side of TV channel 1102. For example, in FIG. 11, in order to maximize the bandwidth of SF2 1132, the BPF2$_T$ filtering frequency range 1162 is tuned such that its response rolls off in the lower frequency channel next to the TV channel 1102, and PA linearization is used to meet the OOBE requirement in that channel. As described above, the LNA 1042 is optionally protected using optional one or more band-stop filters BSFR with a filtering response 1105 including a single TV channel wide stopband Referring now also to FIG. 12, a white space communications system 1200 according to an embodiment which utilizes separate multiplexers and demultiplexers but shared bandpass filters in the Tx and Rx paths, will now be discussed.

Figure 12:
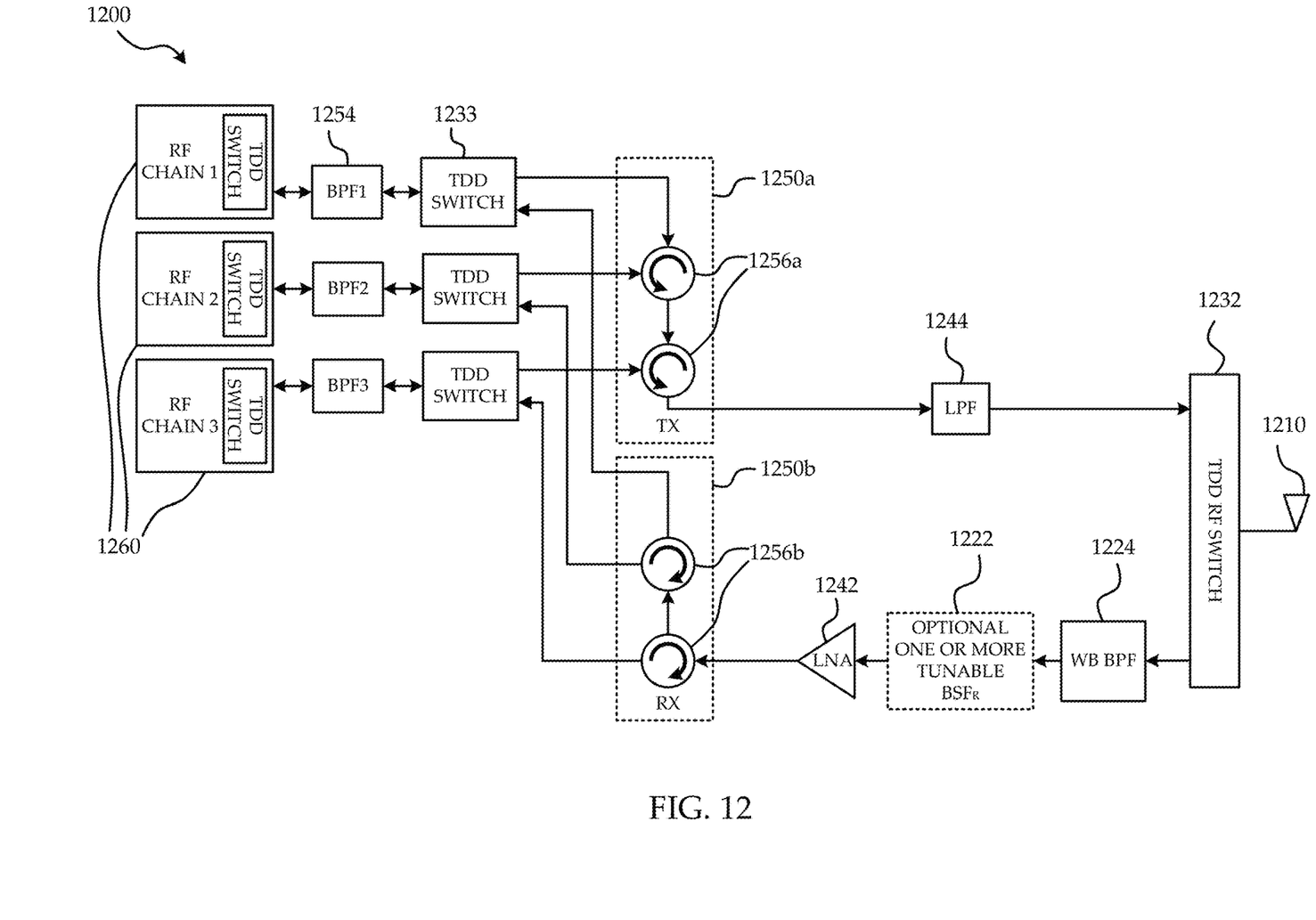
FIG. 12 is a schematic block diagram of a white space communications system according to an embodiment which utilizes separate multiplexers and demultiplexers but shared bandpass filters in the Tx and Rx paths.

Each RF chain 1260 includes a TDD switch for correctly switching between Tx and Rx paths (not shown) farther along the RF chain 1260 and is coupled to a respective tunable bandpass filter 1254, one respectively for each RF chain 1260 and covering the RF chain's portion of the target TVWS band. The tunable bandpass filters 1254 are coupled to respective TDD switches 1233 along transmit-receive paths. Each TDD switch 1233 is coupled to a cascade of circulators 1256a in a Tx multiplexer 1250a and a cascade of circulators 1256b in an Rx demultiplexer 1250b. The cascaded circulators 1256a of the Tx multiplexer 1250a is coupled to a TDD RF switch 1232 via an LPF 1244 along a transmit path. The cascaded circulators 1256b of the Rx demultiplexer 1250b is coupled to the TDD RF switch 1232 via an LNA 1242 for reducing Rx insertion loss, a WB BPF 1224, and optionally one or more tunable band-stop filters BSFR 1222 along a receive path. The WB BPF 1224 and optional band-stop filters BSFR 1222 provide protection for the LNA 1242 and the Rx chain. The TDD RF switch 1232 is coupled via a transmit-receive path to an antenna 1210.

While the embodiments described hereinabove have been described in the context of systems operating across one target TVWS band (470-602 MHz) range, the above teachings apply to all TVWS bands or any other frequency band or bands with a similar spectrum allocation procedure.

While several embodiments described hereinabove have been described as systems with triplexers operating with three RF chains corresponding to the three portions of the target TVWS band, in general, higher order multiplexers and demultiplexers may be utilized for any number of RF chains and corresponding subportions of the target TVWS band or bands.

Although not shown or discussed in detail, it is to be understood that the wide space communications systems also include various further processing and circuitry for supporting operations such as establishing communications with a WSDB, retrieving and storing relevant information retrieved therefrom, and in accordance therewith, processing and controlling all the above described circuitry, and in particular the tunable band-stop and bandpass filters, in accordance with information surrounding blocked segments. Further details of known approaches to these are beyond the scope of this disclosure.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A white space communications system for wideband communications over a Television White Space (TVWS) spectrum within a target TVWS band, the system comprising: at least one tunable frequency filter along at least a transmit path for rejecting frequencies within at least one blocked segment of frequencies within a range of frequencies spanned by the target TVWS band; a plurality of RF chains each for communicating over a frequency subportion of the target TVWS band, the frequency subportions of the plurality of RF chains collectively spanning the target TVWS band; and at least one sharp bandpass filter along at least a transmit path for providing sharp rejection of out-of-band emissions (OOBE) outside the range of frequencies spanned by the target TVWS band.

2. The white space communications system of claim 1, wherein the at least one tunable frequency filter comprises at least one tunable bandpass filter.

3. The white space communications system of claim 2, wherein the at least one tunable bandpass filter comprises one or more tunable bandpass filters located along each RF chain.

4. The white space communications system of claim 3, wherein the RF chains are multiplexed by multiplexers and demultiplexed by demultiplexers separate from the multiplexers.

5. The white space communications system of claim 4, wherein the at least one sharp bandpass filter comprises a plurality of bandpass filters collectively spanning the target TVWS band, each bandpass filter located in a respective RF chain in a transmit path.

6. The white space communications system of claim 3, wherein the at least one tunable frequency filter comprises at least one tunable band-stop filter, and wherein the at least one sharp bandpass filter comprises a plurality of bandpass filters collectively spanning the target TVWS band, each bandpass filter located in a respective RF chain in a transmit path.

7. The white space communications system of claim 3, wherein the at least one tunable frequency filter comprises at least one tunable band-stop filter, and wherein the at least one sharp bandpass filter comprises a sharp wideband bandpass filter.

8. The white space communications system of claim 2, wherein the at least one tunable frequency filter comprises at least one tunable band-stop filter having a band-stop bandwidth at least as wide as the bandwidth of a single television channel.

9. The white space communications system of claim 2, wherein the at least one sharp bandpass filter comprises a plurality of bandpass filters collectively spanning the target TVWS band.

10. The white space communications system of claim 2, wherein the at least one sharp bandpass filter comprises a sharp wideband bandpass filter.

11. The white space communications system of claim 1, wherein the at least one tunable frequency filter comprises at least one tunable band-stop filter having a band-stop bandwidth at least as wide as the bandwidth of a single television channel.

12. The white space communications system of claim 11, wherein each at least one tunable band-stop filter has a tunable center frequency and has a fixed bandwidth substantially the same as that of a TV channel.

13. The white space communications system of claim 11, wherein each at least one tunable band-stop filter has a tunable center frequency and a tunable bandwidth.

14. The white space communications system of claim 11, wherein the at least one sharp bandpass filter comprises a plurality of bandpass filters collectively spanning the target TVWS band.

15. The white space communications system of claim 11, wherein the at least one sharp bandpass filter comprises a sharp wideband bandpass filter.

16. The white space communications system of claim 15, wherein the RF chains are multiplexed by multiplexers and demultiplexed by demultiplexers separate from the multiplexers.

17. The white space communications system of claim 14, wherein the RF chains are multiplexed by multiplexers and demultiplexed by demultiplexers separate from the multiplexers.

18. The white space communications system of claim 1, wherein the at least one sharp bandpass filter comprises a sharp wideband bandpass filter.

19. The whitespace communications system of claim 1, wherein the at least one sharp bandpass filter comprises a plurality of bandpass filters collectively spanning the target TVWS band, each bandpass filter located along a respective RF chain.

\* \* \* \* \*